ALARM ACTUATED CARRIER-CURRENT TRANSMITTER

INVENTOR.
LANCE L. HENRIQUES
BY Homer J. Bridger
AGENT.

INVENTOR.
LANCE L. HENRIQUES
BY Homer J. Bridger
AGENT.

INVENTOR.
LANCE L. HENRIQUES

BY

AGENT.

INVENTOR.
LANCE L. HENRIQUES
BY Homer Bridger
AGENT.

United States Patent Office 3,447,100
Patented May 27, 1969

3,447,100
ALARM ACTUATED CARRIER-CURRENT TRANSMITTER

Lance L. Henriques, New York, N.Y., assignor to Davis Foreman, Bronx, N.Y.

Original application June 9, 1964, Ser. No. 373,728. Divided and this application June 6, 1966, Ser. No. 570,104
Int. Cl. H03k 3/26
U.S. Cl. 331—111 1 Claim

ABSTRACT OF THE DISCLOSURE

A carrier-current transmitter for applying high-frequency signals (e.g. induced by a local alarm) to a pair of power lines for transmission to a remote station for inducing corrective action, the transmitter including a PNP and an NPN transistor and a rectifying diode connected to one of the power lines to form the positive supply terminal while the other line directly forms the other supply terminal; the bases and collectors of the transistors are cross-coupled by feedback capacitors (49, 52) while the emitters of the PNP transistor (43) and the NPN transistor (45) are directly connected to the positive and negative supply terminal. The capacitor (56) connects the collector output of the PNP transistor directly to the power line behind the rectifier while a choke ties the collector to the other power line.

This application is a division of pending application Ser. No. 373,728, filed June 9, 1964.

This invention relates to detection systems and more particularly to a system utilizing a high frequency electrical signal impressed upon a conventional power line.

In the past, numerous detection systems have been built which detect fire, smoke, burglars or other dangers to property, life or limb. Among these are included wireless and telegraph systems. Wireless radio systems are very complex, requiring expensive sending and receiving equipment. Further, radio systems impose on the available radio frequency allocations needed for other purposes and require high power for communicating over long distances. When it is often necessary to detect the exact nature or location of a danger or other event, highly complex equipment is needed to encode the desired information in the transmitted signals.

Telegraph systems commercially available require individual wires which must run from each detecting station to a central monitoring station. Devices of this type cannot readily be installed into standing structures without large investments in materials and labor for installing pairs of wires throughout the structures to be protected. Moreover, devices of this type are normally always energized, thus requiring frequent replacement of component parts.

It is an object of the present invention to provide a new and improved detection system and components thereof.

It is another object of the present invention to provide a detection system utilizing high frequency electrical signals impressed upon conventional power lines.

It is still another object of the present invention to provide a detection system and components thereof having unique facilities for the encoding of signals to permit a receiver to discriminate between types of signal as well as between sending units.

It is a further object of the present invention to provide a detection system and components therefor having instrumentalities rendered effective upon the receipt of a signal to summon aid and to indicate the location of the sending unit that is transmitting the signal and identifying the danger.

These and other objects are accomplished by detecting units which activate novel sending units for transmitting electrical signals of predetermined frequencies. These signals are imposed on the house current for transmission to receiving units. The sending units are energized to transmit signals upon detecting a known condition. For example, a thermostat may connect a sending unit to a power line when a predetermined temperature is exceeded. This temperature limit may be indicative of a fire, failure of refrigeration or air conditioning, shorting in wires or any other condition capable of generating excess heat.

The sending units may also be energized by interruption of a light beam. The light beam, after being rendered invisible by appropriate filtering arrangements, may be crisscrossed about a room by means of hidden mirrors to a photocell. Unauthorized presence would then interrupt the beam. Sound, vibration and motion detectors could similarly be used to detect known conditions and energize the sending units.

The sending units each impress their characteristic high frequency electrical signals on the house power lines. In the case of a home, this normally would be 120 volt, 60 cycle power lines or 220 volts in industrial buildings. Each sending unit generates its characteristic frequency which is detected by the receiving unit of this invention having tuned circuits corresponding to the frequencies of each of the sending units. The superintendent's receiving unit also referred to herein as the master unit, is connected to the power lines for receiving the high frequency signals transmitted by the sending units. This unit is provided with means to indicate the type of signal and location of the signalling sending unit, means to summon a watchman and means to summon outside help by transmitting prerecorded messages to the police or fire department, indicating type of danger and assistance needed.

Individual receiving units tuned to a specific frequency may also be located in the vicinity of a sending unit to initiate a localized warning. For example, a bell operated by an individual receiver could be positioned on each floor of an apartment house to indicate a fire on that floor. This bell would sound at the same time that the master unit is signalled to warn local occupants of the danger.

A complete understanding of the present invention may be had by considering the following detailed description in conjunction with the drawing wherein.

Figure 1:
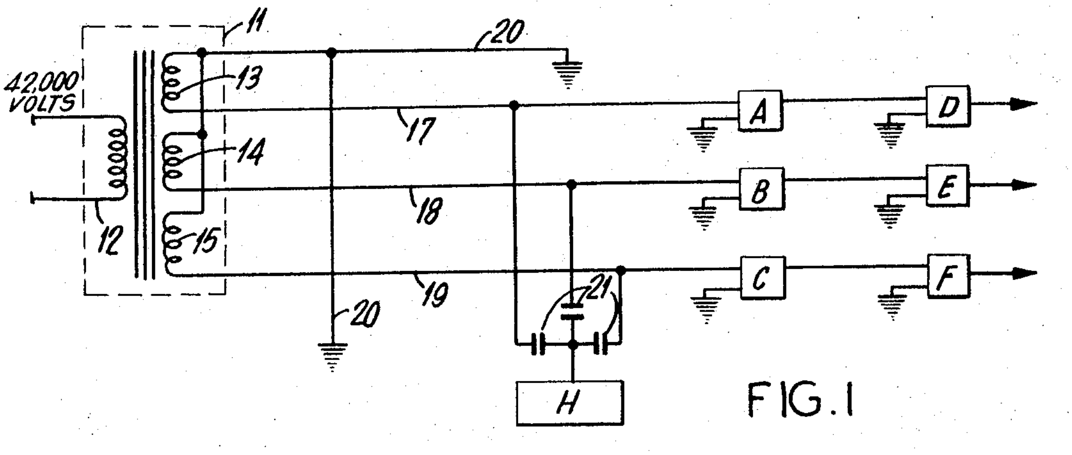
FIGURE 1 is a diagram of the system of this invention and shows sending units, receiving units and a master unit connected to power lines in accordance with the principles of the present invention.

In FIGURE 1, the detection system of the present invention is shown. To facilitate the description of the system, it will be assumed that the system is in an apartment building and used to detect fires. A transformer 11 has a primary winding 12 and three secondary windings 13, 14 and 15. This transformer corresponds to the step down transformer normally found on a utility pole. Forty-two thousand volts on the primary winding 12 are stepped down to 120 volts standard house voltage by each of the secondary windings 13, 14, and 15.

Each line 17, 18 and 19 usually runs to a fuse box in the building and would constitute three separate circuits. A common line 20 is associated with the three circuits. For convenience, it is assumed that lines 17, 18 and 19 run to the first, second and third floors of the building, respectively, although they could each serve separate apartments or local circuits in the apartment.

Sending units A, B and C, and local receiving units D, E and F are located on the first, second and third floors, respectively. A superintendents main receiving unit H may be advantageously located in the manager's office or maintenance station of the apartment building.

The sending units A, B and C are novel high-frequency oscillators of the type described below which are capable of applying signals to lines 17, 18 and 19, respectively. The sending units are advantageously miniaturized for unobtrusive mounting, as on the inside of a wall outlet. However, the sending units may be mounted in any desired location. The sending units are normally disconnected from the power line, as set forth below, and hence the components are not subject to constant wear or aging.

For fire detection, a thermostatic switch may be used which connects the sending unit to the power line upon sensing a predetermined temperature limit. This thermostat may be any one of the commonly available varieties, for example, a bimetal which closes contacts.

Upon sensing a fire on the first floor, sender A is energized and applies a high frequency oscillation characteristic of this sending unit to the power line 17. This oscillation is of the order of 1 kilocycle–400 kilocycles. Local receiver D on the same floor and the main unit H receive the signal. Receiver D may be provided with a time delay device, which after a predetermined time will ring a bell to alert occupants of the floor of the impending danger.

The main unit H need not be connected to the same circuit as the sender A. Normally the proximity of the wires forming the circuits in the house conduits provides sufficient capacitive coupling between the lines to impress a signal on any one line to the other two lines. To insure sufficient coupling between lines 17, 18 and 19, low value capacitors 21 (in the order of 0.001 microfarad), may be connected between the lines. These capacitors 21 pass only negligible amounts of 60 cycle current but will readily pass the high-frequencies of the signal.

Figure 2:
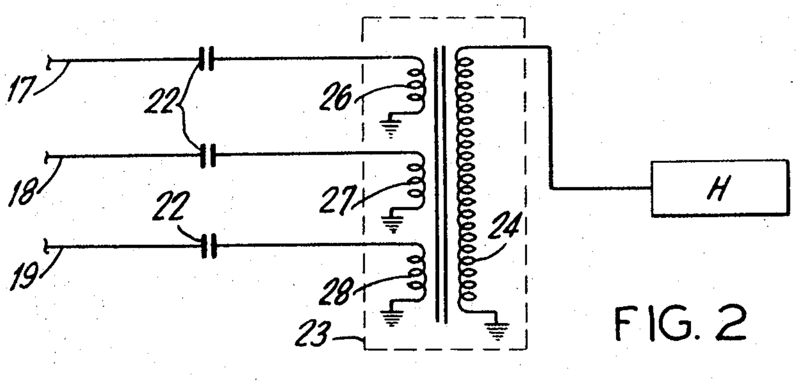
FIGURE 2 shows a master receiving unit according to this invention connected by a transformer to three separate circuits.

Another coupling arrangement is shown in FIGURE 2, where lines 17, 18 and 19 are connected across capacitors 22 to a transformer 23. Winding 24, which is common to windings 26, 27 and 28, each of which is connected to one of the lines 17, 18 and 19, respectively, will, therefore, be excited by a signal in any one of the lines 17, 18 and 19.

The main unit H, upon receiving the signal from sender A, activates a time-delay device for rejecting transient noise or false signals. A true signal energizes the circuit tuned to the characteristic frequency of sender A. This energized tuned circuit activates an indicator showing the location of the sending unit. After a predetermined time, delay devices operate an audible signal to summon an attendant. If an attendant does not arrive to turn off the audible signal, after another predetermined period of time, a further device may summon outside aid. This may be accomplished by an automatic phone-calling device which can relay taped messages to the fire or police departments.

The invention will now be explained in further detail by considering the individual sending and receiving units A and D respectvely, on the first floor of the building mentioned above, and the master or superintendent's unit H in the manager's office (see FIGURE 1).

Figure 3:
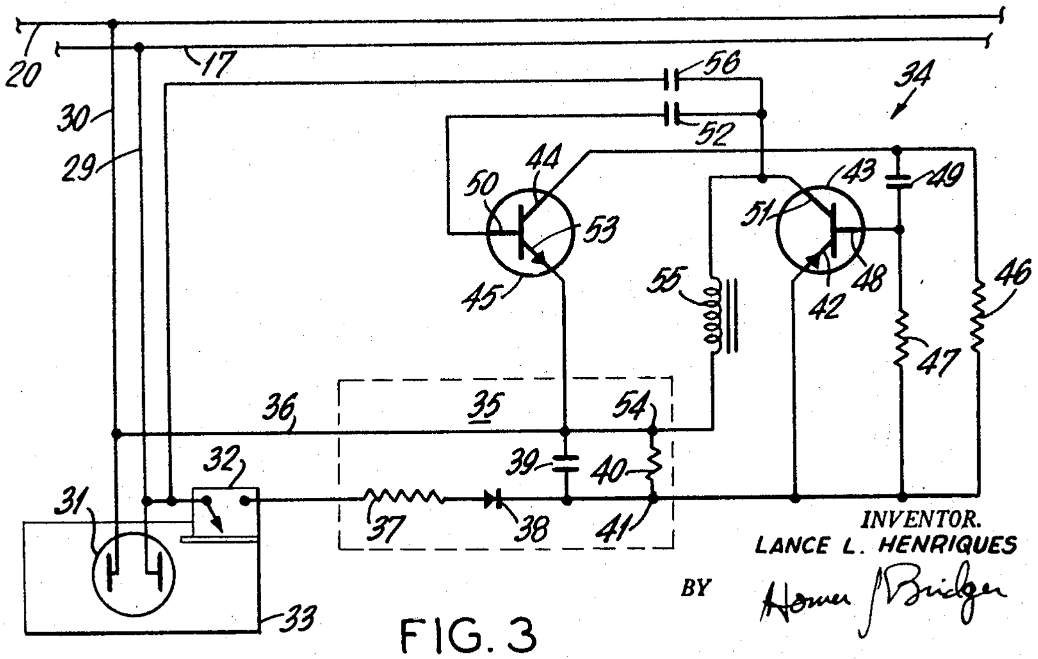
FIGURE 3 shows a schematic diagram of one sending unit according to one aspect of this invention suited for use in the present invention.

In FIGURE 3 a typical circuit for sending unit A is depicted. Power lines 17 and 20 (see FIGURE 1) supply house current from the main fuse box (not shown) to the entire first floor. Individual feeder lines 29 and 30 in the building wiring system are respectively connected from power lines 17 and 20 to the rear of wall outlet 31 in the apartment where detection of danger is to be made. Assume that the danger to be detected is the excessive heat caused by fire in the vicinity of the outlet 31. In such a case one side of thermostat 32, which is mounted on wall outlet plate 33 by a mounting bracket, is connected to power line 29. The other side of thermostat 32 is connected to power supply 35 of electronic sender unit 34, the sender being packaged to be installed in close proximity to power lines 29 and 30 and thermostat 32. Power line 30 is connected to power supply 35 by means of lead 36. Power supply 35 includes resistor 37, diode 38 in series with resistor 37 and the parallel combination of capacitor 39 and resistor 40 connected between the cathode of diode 38 and lead 36. The positive output terminal 41 of power supply 35 is directly connected to the emitter 42 of PNP transistor 43, and to the collector 44 of NPN transistor 45 through DC collector load 46. Bias resistor 47 interconnects base 48 and emitter 42 of transistor 43. Base 48 of transistor 43 is connected to collector 44 of transistor 45 through coupling capacitor 49, and base 50 of transistor 45 is connected to collector 51 of transistor 43 through coupling capacitor 52. Emitter 53 of transistor 45 is directly returned to negative terminal 54 of power supply 35, and collector 51 is returned to terminal 54 through choke 55. The output of sender 34 is taken from collector 51 and is applied to AC power lead 29 through capacitor 56.

Sender 34 is actuated when the high temperature in the vicinity of outlet 31 closes thermostat 32, thus connecting power supply 35 (which drives transistors 43 and 45) directly to AC feeder lines 29 and 30. In the configuration shown, transistors 43 and 45 and the associated circuitry form a high-frequency oscillator whose frequency is determined by feedback capacitors 49 and 52. Choke 55 and capacitor 56 effectively form a high-pass filter which prevents 60 cycle power from feeder lines 29 and 30 from entering sender 34, while simultaneously allowing the high frequency output of sender 34 to be applied to feeder lines 29 and 30. The output frequency of sender 34 is thus superimposed upon the 60 cycle power lines 29 and 30, and coupled therefrom to the power lines 17 and 20 for simultaneous transmission thereof to local receiver unit D in the corridor and superintendent's unit H (see FIGURE 1), located centrally for the entire building.

Present senders are limited to specific carrier frequencies, but variations such as modulation of frequency, multi-tone encoding or duration and repetition encoding may be included within the scope of the invention and such circuits modifying the basic sender are known.

Figure 4:
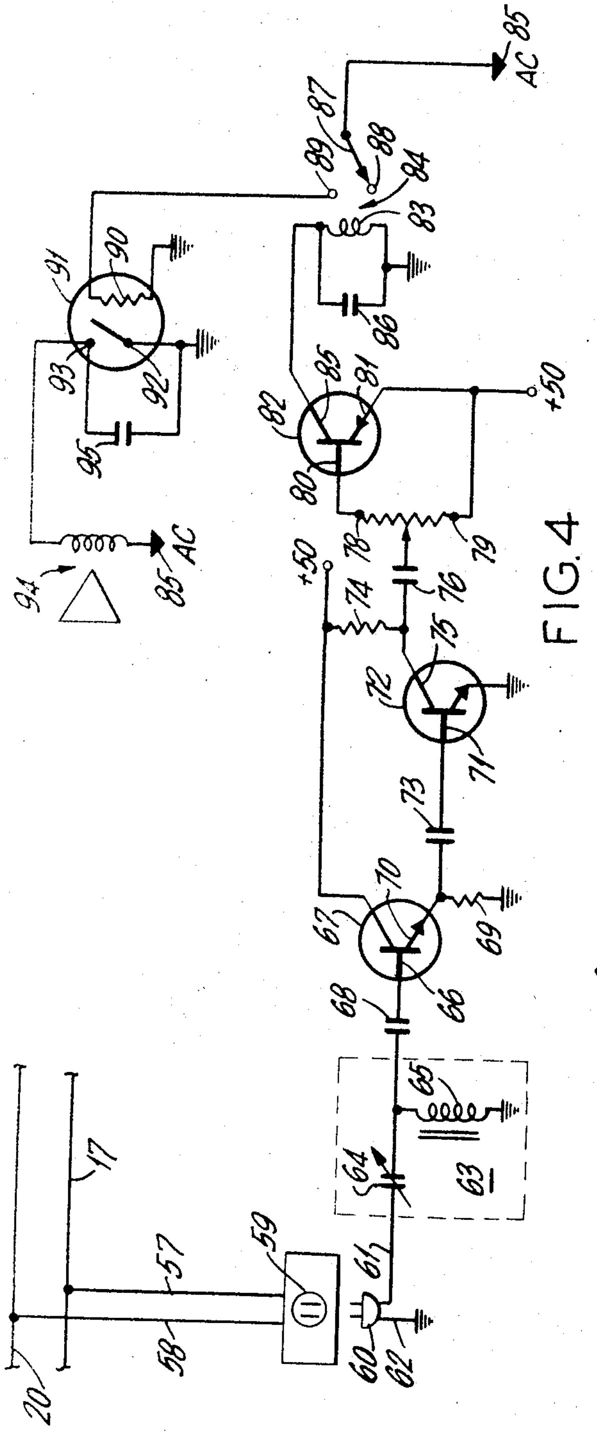
FIGURE 4 shows a schematic diagram of a receiving unit according to another aspect compatible with the sending unit of FIGURE 3.

Local floor receiver D is depicted in FIGURE 4. Feeder lines 57 and 58 respectively couple 60 cycle AC power from main floor lines 17 and 20 to wall outlet 59 at the location of receiver D. Receiver wall plug 60, which is adapted to mate with outlet 59, houses leads 61 and 62 (the latter constituting a common or ground connection) and is connected across a tuned series circuit 63 comprising variable capacitor 64 and choke 65. Tuned circuit 63 is resonant at the output frequency of sender 34, which is superimposed upon feeder lines 57 and 58 servicing receiver D; tuned circuit 63 thus acts as a blocking filter for the 60 cycle power on lines 57 and 58. The operating voltages for receiver D are provided by a power supply (not shown) similar to power supply 35 of sender 34, but having different voltage and current capacities with respect thereto. The high-frequency signal developed across choke 65 is coupled to base 66 of NPN transistor 67 through capacitor 68. This minimizes the loading effect of transistor 67 on tuned circuit 63. The output of transistor 67 is taken across load resistor 69, and is coupled from emitter 70 of transistor 67 to base 71 of transistor 72 through coupling capacitor 73. Load resistor 74 of transistor 72 is connected to collector electrode 75. Capacitor 76 couples the amplified high-frequency signal from collector 75 to a center tap of amplitude control potentiometer 77. Outer terminals 78 and 79 of potentiometer 77 are respectively coupled to base 80 and emitter 81 of PNP transistor 82. Exciting coil 83 of AC relay 84 is connected in series with collector 85 of transistor 82. Coil 83 is also bridged by filter capacitor 86. Contact arm 87 of relay 84 is connected to an AC power source 85. Contact arm 87 is normally connected to standby contact 88. Actuating contact 89 is connected to element 90 in thermal time delay relay 91.

Normally open contacts 92 and 93 of time delay relay 91 couple an indicating device 94, typically an alarm bell, to the AC source. Capacitor 95 is connected across contacts 92 and 93 to prevent contact noise which could be fed back to the AC power lines 17 and 20 and interfere with the operation of receiver D.

The high frequency danger signal, transmitted by sender 34 (i.e. sender A of FIGURE 1) along the main floor power lines 17 and 20, is received at outlet 59 via feeder lines 57 and 58. Receiver D couples to feeder lines 57 and 58 through wall plug 60. The presence of an amplified high frequency disturbance signal across exciting coil 83 of relay 84 switches the contact arm 87 from standby contact 88 to actuating contact 89 thus energizing element 90 of time delay relay 91. After a predetermined total signal time, typically 20 seconds, contacts 92 and 93 close and actuate the alarm device 94 which is typically located on the same floor as sender A and receiver D. Variable amplitude potentiometer 77 is left adjustable to provide the proper amplified signal level from any sending unit on the floor employing power wires 17 and 20 irrespective of its distance from receiver D. The time delay defeats spurious signals of the disturbance frequency. This is easily accomplished since signals of less than 20 seconds duration have no effect.

Figure 5:
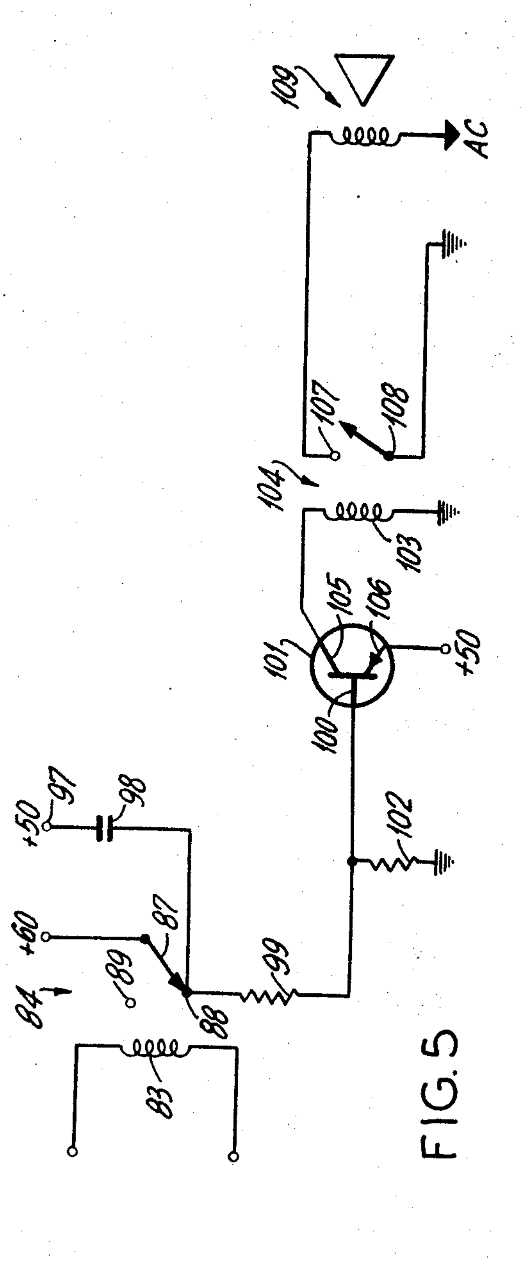
FIGURE 5 shows a schematic diagram of a novel electronic time delay compatible with the receiving unit.

An alternative configuration to time delay relay 91 is shown in FIGURE 5. In this arrangment, which utilizes electronic rather than thermal delay means, contact arm 87 is directly connected to source 96 of positive DC potential. Standby contact 88 is connected to source 97 of less positive DC potential through capacitor 98. Resistor 99 connects standby contact 88 to the base 100 of PNP transistor 101. Base 100 is connected to the negative terminal (ground) of DC source 97 through bias resistance 102. Exciting coil 103 of relay 104 is connected to collector 105 of transistor 101, and emitter 106 is returned to the positive side of source 97. Normally open contacts 107 and 108 of relay 104 are connected to indicating device 109.

When contact arm 87 is in its normally open position (see FIGURE 4), capacitor 98 is charged to a voltage equal to the difference between the respective voltages provided by sources 96 and 97. The voltage at the base 100 is thus positive with respect to that at emitter 106; hence, transistor 101 is not conducting, coil 103 of relay 104 is not energized, and the alarm 109 is off. When the high-frequency signal is sent over power lines 17 and 20 to receiver D, coil 83 of relay 84 is energized and contact arm 87 switches from standby contact 88 to actuating contact 89. Source 96 is disconnected from the remainder of the circuit and capaictor 98 discharges through resistances 99 and 102. When the discharge of capacitor 98 has proceeded for a time long enough to render the potential at base 100 negative with respect to the potential at emitter 106, transistor 104 will conduct, coil 103 will be energized and alarm 109 will be sounded.

The time delay between the receipt of the disturbance frequency signal at receiver D (i.e. the energizing of relay 84) and the sounding of alarm 90 (i.e. the energizing of relay 104) is accurately controlled by the discharge time of capacitor 98, which in turn is a function of (a) the capacitance magnitude thereof, (b) the magnitude of resistances 99 and 102 and (c) the initial voltage on capacitor 98 immediately prior to the actuation of relay 84. The advantage of this arrangement is that the same time will always elapse between actuation and alarm even in the presence of frequently occurring spurious transients in the power lines 17 and 20 at the disturbance frequency. This is made possible by the extremely short charging time of capacitor 98 when contact arm 87 is restored to standby contact 88 upon the de-energizing of relay 84. By contrast, thermal time delay relays commonly yield varying delay times when recycled within their normal delay interval.

Figure 6:
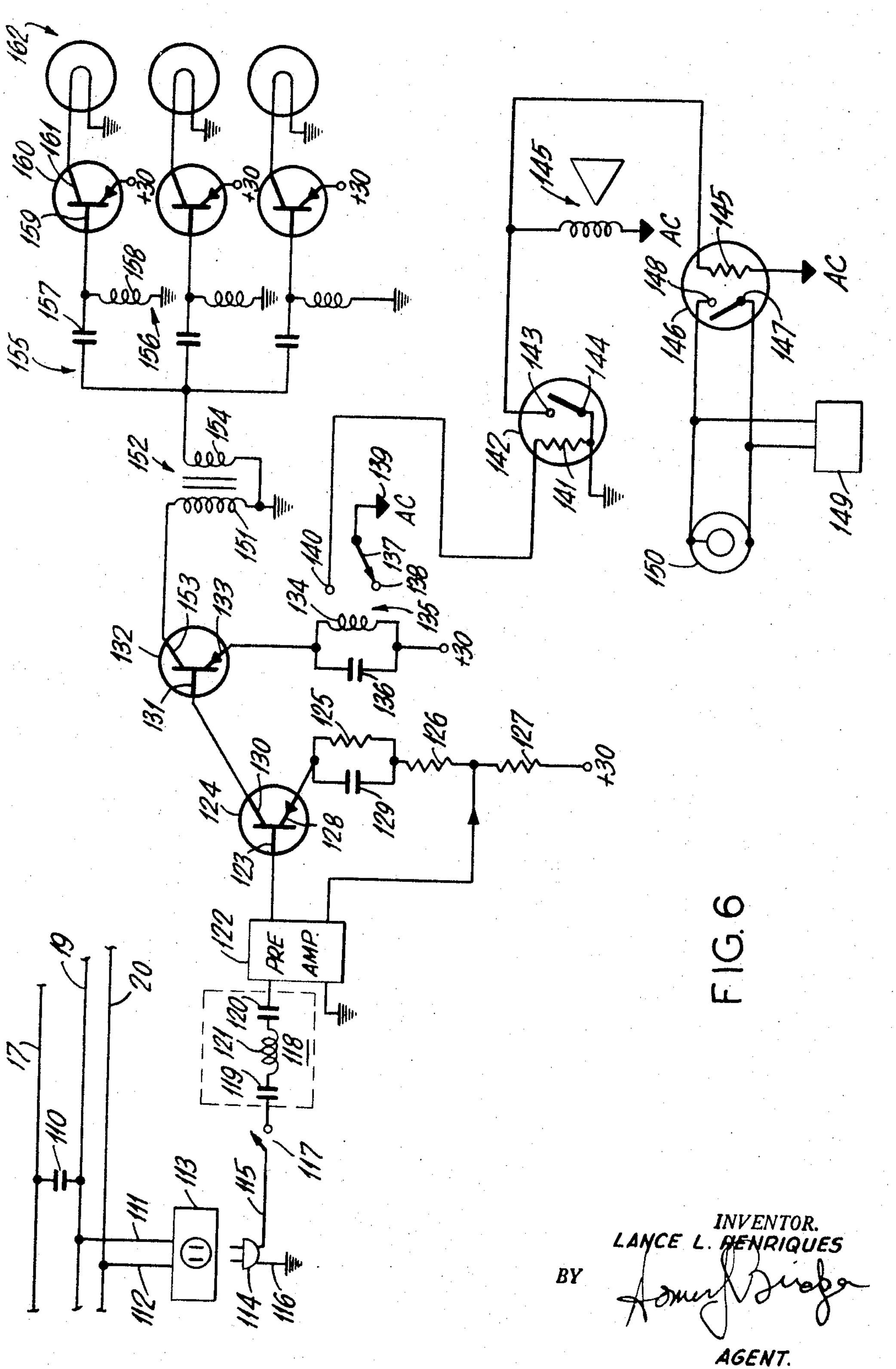
FIGURE 6 shows a schematic diagram of a master unit for receiving multiple signals from sending units of the type shown in FIGURE 3.

Because of the capacitive coupling between power lines (see FIGURE 1), the high frequency danger signal transmitted by sender A will be received by superintendent's unit H at a central location, at virtually the same time as at receiver D. In FIGURE 6, a superintendent's unit is shown which is located on a different floor from sender A. Capacitor 110 coupes the high-frequency danger signal generated by sender A from power line 17 on the first floor of the building to power line 19 on the floor in which the superintendent's unit is located. Power line 20 is common to all floors, as indicated above. Feeder lines 111 and 112 couple the disturbance signal to wall outlet 113 in the central location, i.e. the manager's office. As noted before, a number of distinct frequencies may be simultaneously coupled into outlet 113 from sending units located in all portions of the building. Wall plug 114, which is adapted to mate with outlet 113, houses leads 115 and 116 (the latter being a common or ground connection). Lead 115 is connected through key switch 117 to a 60-cycle trap 118 which comprises the series combination of capacitors 119 and 120 and choke 121. Trap 118 de-couples each disturbance frequency from the 60-cycle power frequency. The disturbance signal output level of trap 118 is initially amplified in preamplifier 122 and is then applied to base 123 of NPN transistor 124. Bias resistors 125, 126 and 127 provide the correct operating level for emitter 128 of transistor 124, and smoothing capacitor 129 is connected across resistor 125. Collector 130 of transistor 124 is coupled to base 131 of transistor 132. Emitter 133 of transistor 132 is connected in series with energizing coil 134 of relay 135, coil 134 being bridged by filter capacitor 136. Coil 134 also serves as a resistive load for transistor 132. Contact arm 137 of relay 135, which is normally connected to standby contact 138, is coupled to AC source 139. Actuating contact 140 of relay 135 is connected to element 141 of time delay relay 142. The normally open contacts 143 and 144 of relay 142 connect the AC source to alarm device 145. Contacts 143 and 144 of relay 142 also connect the AC source to element 145 of a second time delay relay 146. The normally open contacts 147 and 148 of relay 146 are connected to a master unit disabling switch 149 and to an automatic phone-calling device 150.

Primary winding 151 of signal transformer 152 is connected to collector 153 of transistor 132. The secondary winding 154 of transformer 152 is connected to a bank 155 of indicating circuits, each circuit of the bank being tuned to a separate disturbance frequency peculiar to each individual sending unit in the building. Each indicating circuit comprises an input tuned circuit 156 comprising capacitor 157 and coil 158 which are connected in series across the secondary winding 154. The single frequency output developed by each individual tuned circuit 156 is applied to the base 159 of PNP transistor 160. The amplified output at collector 161 is coupled to a visual indicating device 162 which reads out the presence of the associated disturbance frequency which in turn indicates the location of the sending unit transmitting the disturbance signal.

When master unit H receives the individual disturbance signal transmitted by a particular energized sending unit in the building (either directly from power lead 19 on the same floor or by capacitive coupling from power leads 17 or 18 on the other floors), the resultant onset of conduction of transistor 132 will energize both the frequency-insensitive primary winding 151 and the energizing coil 134. The output developed across the secondary winding 154 is applied to indicator bank 155 and operates the visual indicating device 162 associated with the transmitted disturbance frequency. At the same time the current through coil 134 switches contact arm 137 from standby contact 138 to actuating contact 140, which in turn completes the circuit between the AC source 139 and element 141. After element 141 has been continually energized by the AC source for a predetermined time, contacts 143 and 144 close and alarm device 145 is actuated. If the master unit is not manually shut off with key switch 117 after alarm device 145 is actuated, the second time delay relay 146 is energized and opens disabling switch 149, thus de-energizing alarm device 145. The energizing of relay 146 also triggers the phone-calling device 150 which typically dials and reads out a prerecorded taped message to the police and fire departments.

Figure 7:
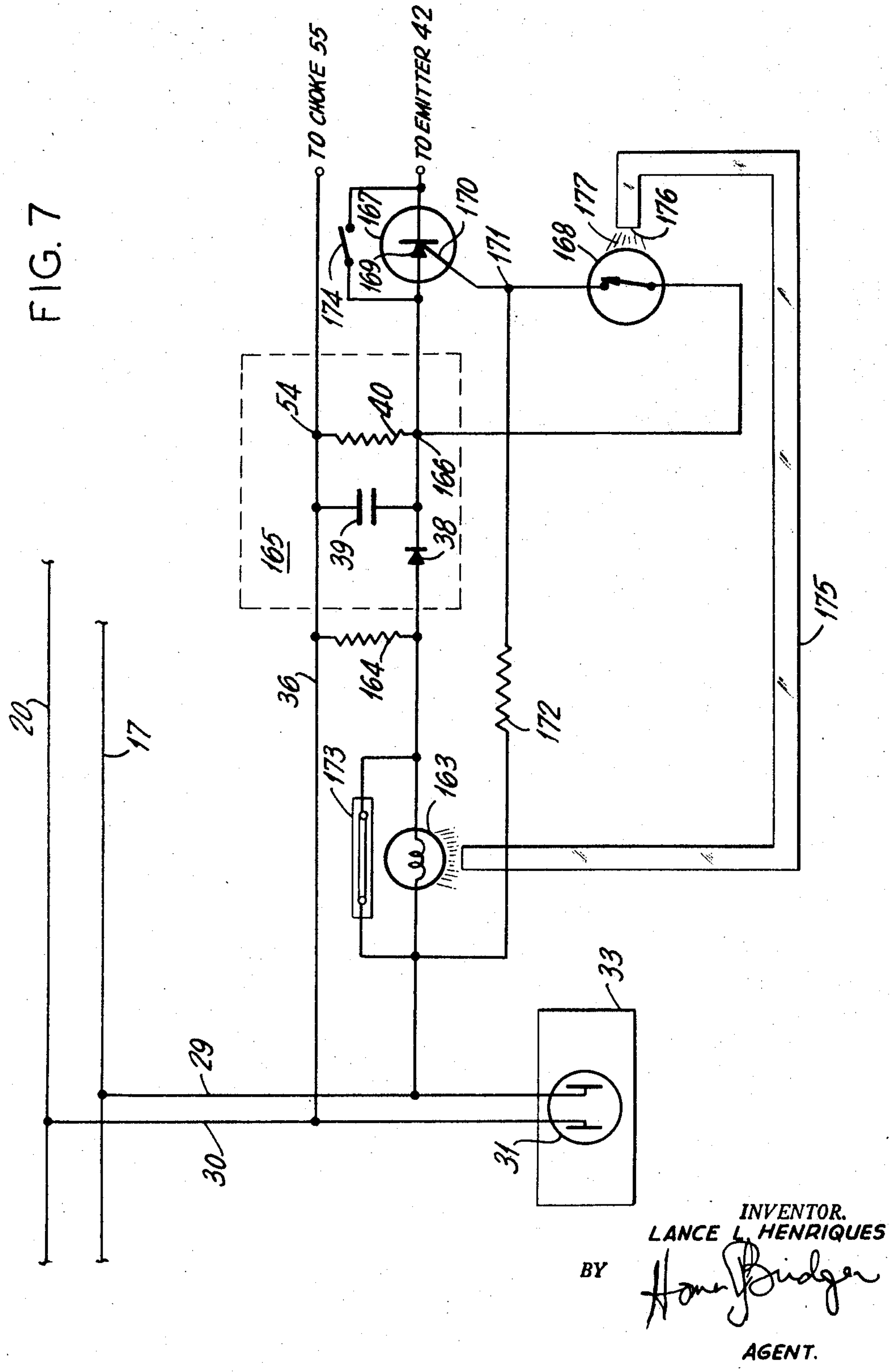
FIGURE 7 shows a schematic diagram of fail-safe electronic eye compatible with the sending unit for energizing the unit upon sensing a condition such as unauthorized presence.

An arrangement for detecting a physical intrusion at a predetermined location is shown in FIGURE 7. This arrangement is adapted for use with sender A of FIGURE 3. A voltage divider comprising control lamp 163 in series with resistance 164 is connected across feeder lines 29 and 30. DC power supply 165, which includes diode 38 in series with the parallel combination of filter capacitor 39 and bleeder resistance 40, is coupled across resistance 164. The DC output terminals 54 and 166 of power supply 165 are respectively connected to choke 55 and emitter 42 (FIGURE 3) of sender A, the latter through silicon-controlled rectifier 167. A normally open photocell 168, which is short-circuited when energized by a light source, is connected in series between anode 169 and control electrode 170 of rectifier 167. Feeder line 29 is connected to the junction 171 of electrode 170 and photocell 168 through resistance 172. A neon bulb 173, which is energized when the voltage thereacross approaches the AC power line voltage, is connected across lamp 163 to indicate failure of the latter, and for this purpose is usually mounted in a place visually and physically accessible to monitoring personnel. A normally open reset switch 174 is connected across rectifier 167. A light sensitive transmission rod 175 extends from lamp 163 to an end point 176 opposite photocell 168. The gap 177 between photocell 168 and end point 176 may include a doorway, window, or other place where intrusion may occur. If desired, one or more reflectors may be used in place of rod 175 for directing the light energy of lamp 163 onto photocell 168, or, if physical conditions allow, lamp 163 may be mounted opposite photocell 168 to shine directly thereon.

Assuming that no intrusion has occurred and that lamp 163 is operating properly, a portion of the AC voltage provided by feeder lines 29 and 30 is coupled to the input of power supply 165 and the remainder is applied across lamp 163. The voltage across lamp 163 is normally insufficient to energize neon bulb 173. The portion of the light energy output of lamp 163 which is coupled to transmission rod 175 is transmitted therein to end point 176 and then across gap 177 to photocell 168, thus switching photocell 168 into its short-circuited state. The resulting short-circuit between anode 169 and control electrode 170 maintains the rectifier 167 in its non-conducting state notwithstanding that a substantial portion of the DC output voltage of power supply 165 is applied between anode 169 and cathode 178. The output of power supply 165 is thus isolated from the remainder of sender A, and no high frequency disturbance signal is generated therein.

Upon the occurrence of the instrusion to be protected against, the light beam across the gap 177 is interrupted, and the de-energized photocell 168 reverts to its open circuited state. As a result the portion of the potential between feeder lines 29 and 30 which is applied through resistance 172 to junction 171 energizes control electrode 170 and drives the rectifier 167 into its conducting state. This completes the circuit between power supply 165 and the remainder of sender A and permits the generation and transmission of the high frequency disturbance signal as heretofore described.

An important feature of this embodiment is that once the sender is energized, it is not disabled by simply removing the obstruction to the light beam caused by the intrusion. Because of the thyratron-like operation of rectifier 167, the mere removal of potential from control electrode 170 caused by short-circuiting photocell 168 will not cause rectifier 167 to revert to its non-conductive state. In order to de-energize sender A after the intrusion has been dealt with, reset switch 167 must be momentarily closed to short circuit the anode-cathode path of rectifier 167. This cuts off rectifier 167 and restores control of its conductive state to electrode 170.

Another important feature of this embodiment is that it can discriminate between physical intrusion and equipment failure and will respond only to the former situation. Although either a failure of lamp 36 or a physical intrusion at gap 177 will cause photocell 168 to be de-energized, it is important to note that in the former case the entire AC voltage at feeder lines 29 and 30 is applied across the lamp 163 and none appears at the input of power supply 165. It follows that no DC voltage appears across the anode-cathode path of rectifier 167 and the latter will remain non-conductive despite the presence of full energizing voltage at electrode 170. Moreover, the presence of the entire power line voltage across the inoperative lamp 163 energizes neon bulb 173. This in turn supplies a visual indication of the failure of lamp 163 and facilitates its rapid detection and correction to minimize the down-time of the sending unit.

Briefly reviewing the overall operation of the system, assume sender A detects the presence of a fire on the first floor of an apartment building. Normally unenergized sender A is energized and applies a high frequency signal to power line 17. This signal is characteristic of only sender A.

Local floor receiving unit D picks up and amplifies the signal. The amplified signal is then applied to a time delay relay. If the signal is present for a predetermined amount of time, the relay closes contacts and an alarm is sounded on the floor. The time delay effectively prevents spurious pulses from sounding the alarm device.

Main receiving unit H receives the disturbance signal simultaneously with receiver D. Since all circuits in the apartment house are capacitively coupled, a signal emanating from any sender will be received by the main unit. The signal is amplified in the main unit and applied to a time delay relay and a bank of indicating devices. A light energized by only the characteristic frequency of sender A immediately indicates the location of the sender transmitting the signal. If the signal is present for a predetermined amount of time, the relay closes contacts, thereby sounding an alarm and energizing another time delay relay. If the alarm is not manually shut off, after another predetermined period of time, the other relay closes contacts, thereby sending a prerecorded taped message to the police and/or fire departments and shutting off the alarm.

It is to be understood that the above-described systems and circuitry are simply illustrative of an application of the principles of the invention, and many other modifications may be made without departing from the spirit and scope of the invention.

What is claimed is:

1. A carrier-current transmitter for applying a high-frequency signal over a pair of power lines constituting a source of alternating current, said transmitter comprising a rectifying power supply connected to said power lines and having a positive and a negative terminal, said power supply including a rectifying diode connected between one of said lines and one of said terminals, the other of said lines forming the other of said terminals; an oscillator including a PNP transistor having an emitter directly connected to said positive terminal, an NPN transistor having an emitter directly connected to said negative terminal, a first coupling capacitor connecting the base of said PNP transistor to the collector of said NPN transistor, a second coupling capacitor connecting the base of said NPN transistor with the collector of said PNP transistor, and bias means respectively connecting said collector of said NPN transistor with the emitter of said PNP transistor, and for connecting the base of said PNP transistor with the emitter thereof; and a high-pass filter connecting said oscillator with said power lines, said high-pass filter including a choke connecting said collector of said PNP transistor with said other of said lines, and a capacitor connecting said collector of said PNP transistor with said one of said lines behind said rectifying diode.

References Cited

UNITED STATES PATENTS

| | | | |
|---|---|---|---|
| 3,115,610 | 12/1963 | Beguin | 331—71 |
| 3,174,107 | 3/1965 | Quackenbush. | |
| 3,239,828 | 3/1966 | Peterman. | |
| 3,147,397 | 9/1964 | Michaelson. | |
| 3,234,543 | 2/1966 | Thompson et al. | |

JOHN W. CALDWELL, *Primary Examiner.*

DONALD J. YUSKO, *Assistant Examiner.*

U.S. Cl. X.R.

331—108, 186; 340—258